March 4, 1958 S. DUINKER 2,825,892

MAGNETIC MEMORY DEVICE

Filed Sept. 8, 1954

INVENTOR
SIMON DUINKER
BY
AGENT 2,825,892

MAGNETIC MEMORY DEVICE

Simon Duinker, Eindhoven, Netherlands, assignor, by mesne assignments, to North American Philips Company, Inc., New York, N. Y., a corporation of Delaware Application September 8, 1954, Serial No. 454,749

Claims priority, application Netherlands September 9, 1953

5 Claims. (Cl. 340—174)

This invention relates to memory devices, and in particular to ferromagnetic cores for use in a plurality of static magnetic triggers. A static magnetic trigger comprises a closed magnetic circuit made from a material having a substantially rectangular polarisation curve and a high remanence, such as a manganese, magnesium ferrite, and comprising the required reading-in and reading-out windings. The polarisation condition of the remanent flux, i. e., the direction of the residual magnetization, determines the information stored in the trigger arrangement. Said information is supplied in the form of electrical impulses to the magnetic circuit, which pulses pass through one or more electric conductors, either windings or single wires, associated with the circuit.

It is known to build such a magnetic circuit with the use of an annular core made from a material having a substantially rectangular polarisation curve or hysteresis characteristic. Such annular cores suffer from several disadvantages: the pulses supplied to the conductors associated with the core require fairly large powers, the maximum recurrence frequency of said pulses is limited and the shape is not favourable in view of the winding operation.

In order to obviate said disadvantages it has been proposed to compose the magnetic circuit of two or more parts, at least one made from a material having a substantially rectangular polarisation curve and a high remanence, the other made from a material of low reluctance. Preferably, moreover, at least the last-mentioned material should have a high electric resistance.

Furthermore it has been suggested to provide a plurality of parts, having a substantially rectangular polarisation curve and a high remanence, with a common part of low reluctance, so that the number of static magnetic triggers, which can be made up by means of such a circuit corresponds to the number of parts of high remanence.

The present invention has for its object to provide a construction for ferromagnetic cores for use in a plurality of static magnetic triggers, in which not only the parts made from a material of low reluctance but also the parts made from a material having a substantially rectangular polarisation curve and a high remanence constitute an aggregate, the invention exhibiting the feature that the ferromagnetic core is made up of a part consisting of a material of low reluctance furnished with juxtaposed slots that are bridged by a plate made from a material having a substantially rectangular polarisation curve and a high remanence.

Figure 1:
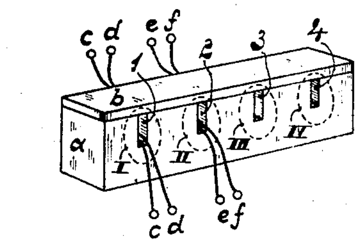
Figure 2:
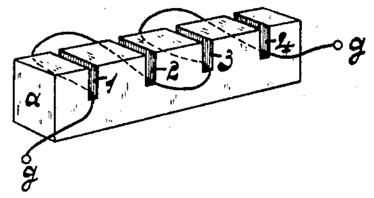
Figure 3:
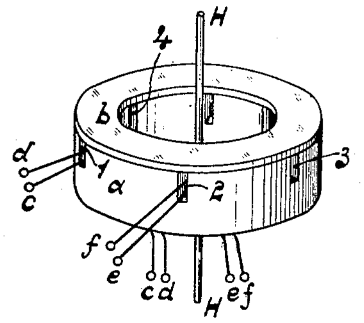
Figure 4:
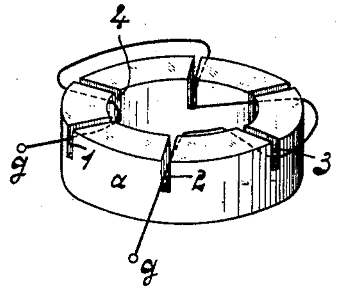

In order that the invention may be readily carried into effect it will now be described, by way of example, with reference to the accompanying drawing, in which Figures 1 and 3 show magnetic circuits in accordance with the invention, and Figures 2 and 4 show parts of said circuits.

With reference to Fig. 1, *a* represents the part made from a material of low reluctance and preferably high electric resistance, such as, for example, the usual magnetically-soft ferromagnetic ferrite, said part *a* being separately shown in Fig. 2. In Figures 1 and 2 the juxtaposed slots are denoted by 1, 2, 3 and 4. Said slots may, for example, be provided by grinding or sawing or by means of ultrasonic means and accommodate the windings consisting of single wires. Thus, for example, both reading-in windings *c* and *e* and reading-out windings *d* and *f* extend through the slots 1 and 2. If a reading-out winding common to all magnetic circuits is to be used, it may, for example, be arranged similarly to the winding *g* shown in Fig. 2. Said slots are bridged by a common plate *b* consisting of a material having a substantially rectangular polarisation curve and a high remanence, it preferably also having a high electric resistance, such as the manganese, magnesium ferrite referred to earlier. The smaller the width of the slots and the thinner the plate *b*, the smaller may be the energy of the pulses supplied to the conductors for transition of the trigger from one remanence condition to the other. The circuits I, II, III, IV indicated in broken lines in Fig. 1 each constitute a magnetic circuit for a static magnetic trigger. As the influence of the air-gap between said parts is to remain low, the parts *a* and *b* are required to contact intimately with each other over comparatively large surface areas that is to say preferably throughout the surface area of part *a* between the slots. The simplest way to ensure this is to surface grind the slotted surface of *a*, similarly as the surface of *b* facing *a*. As will be evident from the foregoing, the slots 1, 2, 3 and 4 form apertures in the low reluctance body *a* so that a magnetic circuit can be formed with the overlying portion of the body *b* that performs the storage function. By providing conductors threading these apertures, coupling to the magnetic circuit is obtained.

Fig. 3 shows a construction having advantages, referred to later, over the construction shown in Fig. 1. The construction itself will be obvious from Figures 3 and 4. *a*, which is separately shown in Fig. 4, again represents the part made from a material of low reluctance and comprising slots 1, 2, 3, 4 and so on, and part *b* being made from a material having a substantially rectangular polarisation curve and a high remanence. In this case, also, Fig. 3 shows, by way of example, grooves 1 and 2 accommodating reading-in windings *c* and *e* and reading-out windings *d* and *f*, Fig. 4 showing a possibly desired common reading-out winding *g*. This construction has the advantage that a single wire, represented by H in Fig. 3, influences in the same sense all the triggers formed by this construction, which may, for example, be used in coincidence circuits for static magnetic triggers. By simultaneous energisation of the conductor H common to all triggers and of the conductor extending through one of the slots, the trigger associated with the last-mentioned conductor may be caused to accept particular information, which it does by assuming a particular remanence state. In this case, the field of the current passed through H should be such that this field alone is too weak to effect transition from one remanence condition to the other. Furthermore said conductor H may be utilised to bring all triggers into the same remanence condition, despite the condition of the triggers. It will be appreciated that such a common winding may also be provided in the construction shown in Fig. 1, but not in said very simple manner. In the construction shown in Fig. 1 such a turn, similarly to the turn *g* shown in Fig 2, requires to be passed through each slot separately.

What is claimed is:

1. A ferromagnetic device adapted for use as a plurality of static magnetic trigger circuits, comprising a first ferromagnetic body having low reluctance and containing a plurality of spaced, juxtaposed apertures, a second ferromagnetic body having a substantially rectangular polarization curve and a high remanence abutting said first body and overlying a plurality of said apertures, first winding means coupled to each of said apertures for causing the associated portion of the second ferromagnetic body to assume one of a plurality of remanence conditions, and second winding means coupled to each of said apertures for reading the remanence condition of said associated portion of the second ferromagnetic body.

2. A ferromagnetic device adapted for use as a plurality of static magnetic trigger circuits, comprising a first ferromagnetic body having low reluctance and having a flat surface containing a plurality of spaced, juxtaposed slots, a second ferromagnetic body having a substantially rectangular polarization curve and a high remanence and having a flat surface abutting the flat surface of said first body and overlying a plurality of said slots, first winding means coupled to each of said slots for causing the associated portion of the second ferromagnetic body to assume one of a plurality of remanence conditions, and second winding means coupled to each of said slots for reading the remanence condition of said associated portion of the second ferromagnetic body.

3. A ferromagnetic device as set forth in claim 2, wherein both the first and second bodies are straight.

4. A ferromagnetic device as set forth in claim 2, wherein both the first and second bodies are annular in form.

5. A magnetic memory device comprising a first ferromagnetic body having low reluctance and a second ferromagnetic body possessing a substantially rectangular hysteresis characteristic and a relatively high remanence, one of said ferromagnetic bodies having a plurality of spaced apertures in a surface thereof, said first and second bodies being in juxtaposed relationship with the surface containing the apertures facing the other body, first winding means coupled to each of said apertures for causing the associated portion of the second body to assume one of a plurality of remanence conditions, and second winding means coupled to each of said apertures for reading the said remanence condition.

References Cited in the file of this patent

UNITED STATES PATENTS

| | | |
|---|---|---|
| 2,064,773 | Vogt | Dec. 15, 1936 |
| 2,430,457 | Dimond | Nov. 11, 1947 |
| 2,585,050 | Simon | Feb. 12, 1952 |
| 2,614,167 | Kamm | Oct. 14, 1952 |
| 2,724,103 | Ashenhurst | Nov. 15, 1955 |

OTHER REFERENCES

Edvac Progress Report #2; June 30, 1946—pages 4–22, 4–23, Py–0–164, Py–0–165.